United States Patent
Liu et al.

(10) Patent No.: US 11,949,609 B2
(45) Date of Patent: Apr. 2, 2024

(54) EHT PREAMBLE DESIGNS FOR TRANSMISSIONS TO MIXED CLIENTS IN WIRELESS COMMUNICATIONS

(71) Applicant: MediaTek Singapore Pte. Ltd., Singapore (SG)

(72) Inventors: Jianhan Liu, San Jose, CA (US); Hung-Tao Hsieh, Hsinchu (TW); Shengquan Hu, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 138 days.

(21) Appl. No.: 17/164,040

(22) Filed: Feb. 1, 2021

(65) Prior Publication Data

US 2021/0258115 A1    Aug. 19, 2021

Related U.S. Application Data

(60) Provisional application No. 62/977,816, filed on Feb. 18, 2020.

(51) Int. Cl.
*H04L 5/00* (2006.01)
*H04L 1/00* (2006.01)

(52) U.S. Cl.
CPC .......... *H04L 5/0044* (2013.01); *H04L 1/0013* (2013.01)

(58) Field of Classification Search
CPC ..... H04L 5/0044; H04L 1/0013; H04L 5/001; H04L 5/0053; H04L 27/2602; H04L 5/0007; H04L 28/06
See application file for complete search history.

(56) References Cited

U.S. PATENT DOCUMENTS

| | | | |
|---|---|---|---|
| 10,716,066 B2 * | 7/2020 | Huang | H04W 52/0216 |
| 11,374,699 B2 * | 6/2022 | Shellhammer | H04B 7/0456 |
| 11,546,938 B2 * | 1/2023 | Chen | H04W 72/0446 |
| 11,564,250 B2 * | 1/2023 | Chen | H04W 72/0446 |
| 2017/0048034 A1 | 2/2017 | Bharadwaj et al. | |
| 2019/0097850 A1 | 3/2019 | Kenney et al. | |
| 2019/0215884 A1 * | 7/2019 | Patil | H04W 52/0216 |
| 2020/0008185 A1 | 1/2020 | Chen et al. | |

(Continued)

FOREIGN PATENT DOCUMENTS

| | | | |
|---|---|---|---|
| CN | 110768757 A | 2/2020 | |
| KR | 20160018351 A1 | 2/2016 | |
| WO | WO 2020009425 A1 | 1/2020 | |
| WO | WO-2020060172 A1 * | 3/2020 | H04L 27/2603 |

OTHER PUBLICATIONS

Taiwan Intellectual Property Office, Office Action for Taiwan Patent Application No. 110104018, dated Jun. 2, 2021.

(Continued)

*Primary Examiner* — Jay P Patel
(74) *Attorney, Agent, or Firm* — Han IP PLLC; Andy M. Han

(57) ABSTRACT

Various proposed schemes pertaining to extreme high-throughput (EHT) preamble designs for transmissions to mixed clients in wireless communications are described. In one example, an aggregated Physical Layer Convergence Procedure (PLCP) protocol data unit (PPDU), which is transmitted over a plurality of 80-MHz bandwidths with data for a plurality of stations (STAs), is received. A preamble of a specific one of the plurality of 80-MHz bandwidths is then decoded.

20 Claims, 11 Drawing Sheets

(56) References Cited

U.S. PATENT DOCUMENTS

| | | | | |
|---|---|---|---|---|
| 2020/0136884 A1* | 4/2020 | Park | ............... | H04L 27/2665 |
| 2020/0177425 A1* | 6/2020 | Chen | ............... | H04L 27/2602 |
| 2020/0228380 A1* | 7/2020 | Yang | ............... | H04L 27/2621 |
| 2021/0014018 A1* | 1/2021 | Noh | ............... | H04L 5/0044 |
| 2021/0036809 A1* | 2/2021 | Shellhammer | ...... | H04B 7/0456 |
| 2021/0045117 A1* | 2/2021 | Chen | ............... | H04W 74/002 |
| 2021/0045151 A1* | 2/2021 | Chen | ............... | H04W 72/0446 |
| 2021/0099256 A1* | 4/2021 | Lee | ............... | H04L 1/1893 |
| 2021/0127291 A1* | 4/2021 | Chen | ............... | H04L 5/0048 |
| 2021/0136679 A1* | 5/2021 | Verma | ............... | H04W 48/20 |
| 2021/0160843 A1* | 5/2021 | Yang | ............... | H04W 72/0406 |
| 2022/0311568 A1* | 9/2022 | Jang | ............... | H04W 72/04 |
| 2022/0346176 A1* | 10/2022 | Jang | ............... | H04W 76/11 |
| 2022/0393792 A1* | 12/2022 | Lim | ............... | H04L 27/2602 |
| 2023/0035527 A1* | 2/2023 | Huang | ............... | H04L 27/2603 |
| 2023/0094276 A1* | 3/2023 | Huang | ............... | H04L 5/001 |
| | | | | 370/329 |

OTHER PUBLICATIONS

European Patent Office, European Search Report for European Patent Application No. 2155143.7, dated Jun. 22, 2021.
China National Intellectual Property Administration, First Office Action in China Patent Application No. 202110179630.X, dated Apr. 29, 2023.
CCL/ITRI: "MAC Procedures for CPCH", 3GPP TSG RAN 1#7 TSG, R1#7(99)B03, Aug. 25, 1999.

* cited by examiner

200

| L-STF | L-LTFs | L-SIG | RL-SIG | U-SIG | EHT-SIG | EHT-STF | EHT-LTFs | DATA |

FIG. 2

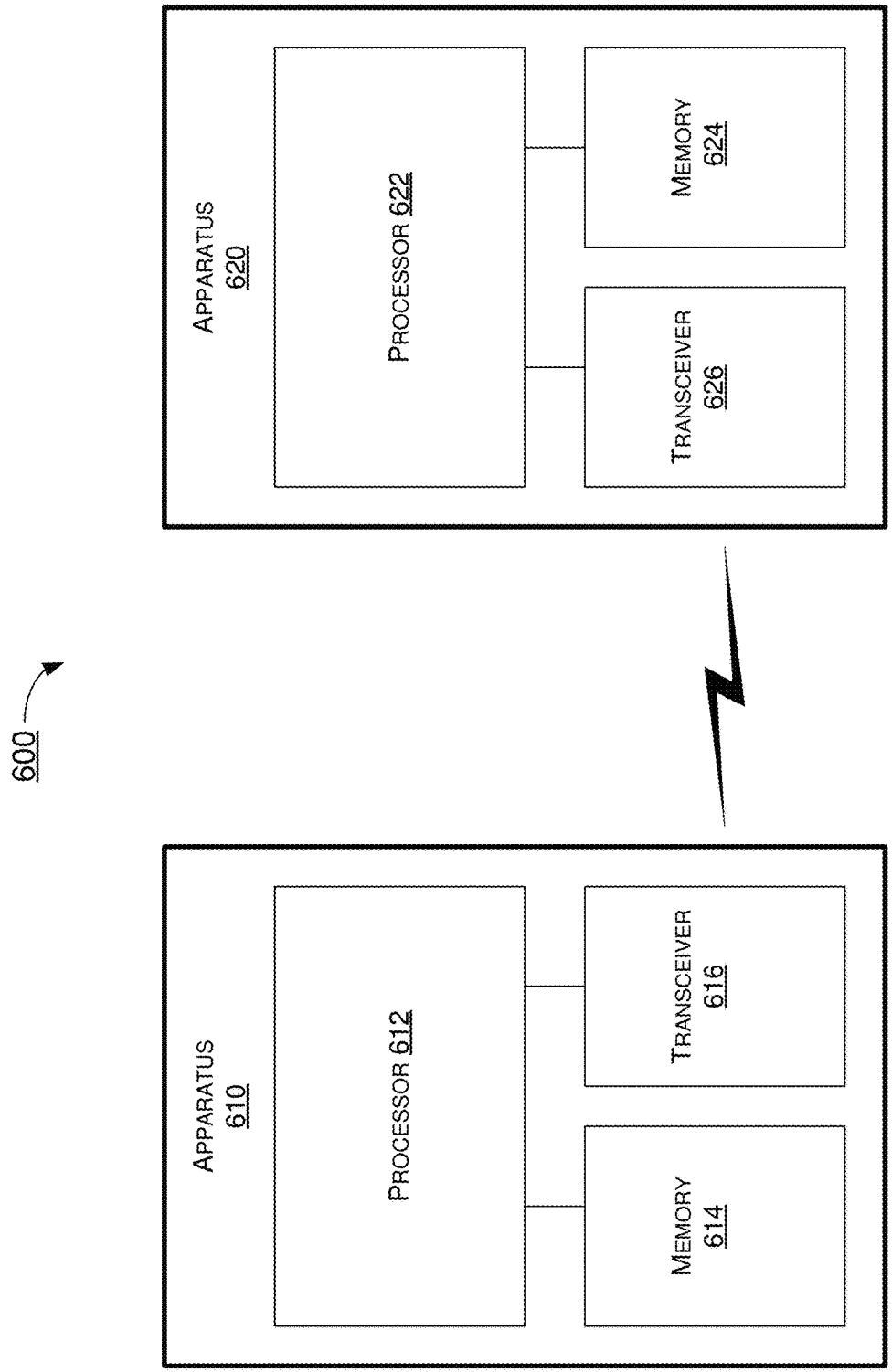

EHT PREAMBLE DESIGNS FOR TRANSMISSIONS TO MIXED CLIENTS IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 62/977,816, filed on 18 Feb. 2020, the content of which being incorporated by reference in its entirety.

TECHNICAL FIELD

The present disclosure is generally related to wireless communications and, more particularly, to extreme high-throughput (EHT) preamble designs for transmissions to mixed clients in wireless communications.

BACKGROUND

Unless otherwise indicated herein, approaches described in this section are not prior art to the claims listed below and are not admitted as prior art by inclusion in this section.

For next-generation wireless communications, including wireless local area networks (WLANs) based on the upcoming Institute of Electrical and Electronics Engineers (IEEE) standards such as the IEEE 802.11 be, EHT transmissions would enable Physical Layer Convergence Procedure (PLCP) protocol data units (PPDUs) and aggregation of multiple resource units (herein interchangeably referred to as "multi-RUs" and "MRUs") in the 240 MHz and 320 MHz bandwidths. Specifically, to enable such features, preamble designs based on the IEEE 802.11 ax/ac standards would not be efficient as the length of the preamble could be very long. In addition, for next-generation EHT WLANs, it would be desirable that a single EHT multi-user (MU) transmission could serve both EHT stations (STAs) and high-efficiency (HE) STAs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT preamble designs for transmissions to mixed clients in wireless communications such as WLANs. Under various proposed schemes in accordance with the present disclosure, it is believed that a preamble proposed herein may enable EHT transmissions with higher efficiency and, additionally, may be used to serve mixed clients such as EHT STAs and HE STAs.

In one aspect, a method may involve receiving an aggregated PPDU which is transmitted over a plurality of 80-MHz bandwidths with data for a plurality of STAs. The method may also involve decoding a preamble of a specific one of the plurality of 80-MHz bandwidths.

In another aspect, a method may involve generating an aggregated PPDU. The method may also involve transmitting the aggregated PPDU over a plurality of 80-MHz bandwidths with data for a plurality of STAs.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example preamble format in accordance with an implementation of the present disclosure.

Each of FIG. 3A

Each of FIG. 4A

Each of FIG. 5A

FIG. 6 is a block diagram of an example communication system in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
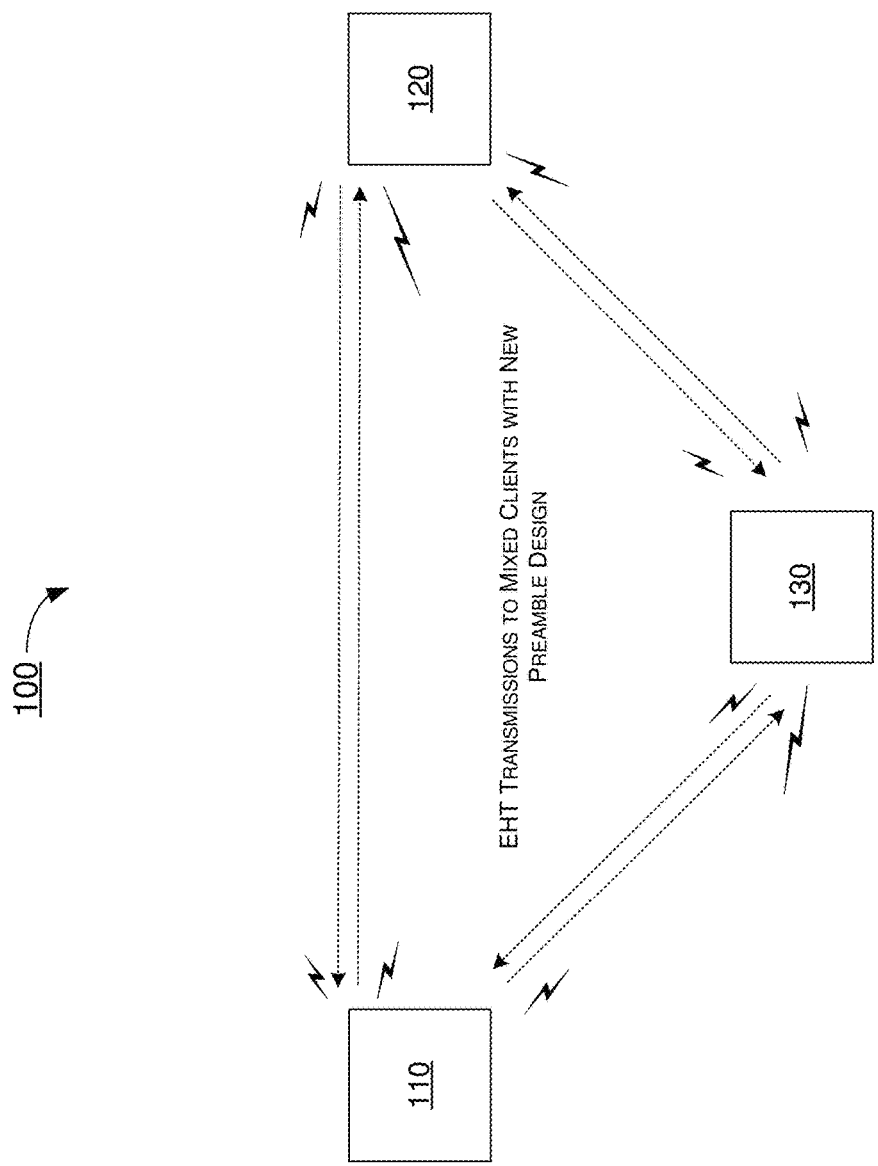
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 5B illustrate examples of implementation of various proposed schemes in network environment 100 in accordance with the present disclosure. The following description of various proposed schemes is provided with reference to FIG. 1~FIG. 5B.

Referring to FIG. 1, network environment 100 may involve a communication entity 110 and a communication entity 120 (and, optionally, a communication entity 130) communicating wirelessly (e.g., in a WLAN in accordance with one or more IEEE 802.11 standards such as IEEE 802.11be). Each of communication entity 110, communication entity 120 and communication entity 130 may be a STA in a WLAN. More specifically, each of communication entity 110, communication entity 120 and communication entity 130 may function or otherwise be configured as an access point (AP) STA or a non-AP STA. Under various proposed schemes in accordance with the present disclosure, communication entity 110, communication entity 120 and communication entity 130 may be configured to perform transmissions with new EHT preamble designs to mixed clients/STAs in wireless communications, as described herein.

FIG. 2 is a diagram of an example preamble format 200 in accordance with an implementation of the present disclosure. Referring to FIG. 2, preamble format 200 may represent a general format of an EHT PPDU. Preamble format 200 may include a legacy short training field (L-STF), a legacy long training fields (L-LTFs), a legacy signal field (L-SIG), a repeated legacy signal field (RL-SIG), a universal signal field (U-SIG), an EHT signal field (EHT-SIG), an EHT short training field (EHT-STF), EHT long training fields (EHT-LTFs), and a data field. Under the proposed scheme, detection of the EHT PPDU may be based on the LENGTH field in L-SIG and RL-SIG to a value N such that mod(N, 3)=0.

Under the proposed scheme, a length of the U-SIG field may be two orthogonal frequency-division multiplexing (OFDM) symbols long, and the U-SIG field may be jointly encoded in the EHT preamble immediately after the RL-SIG field. The U-SIG field may contain a version-independent content, which is intended to achieve better coexistence among future IEEE 802.11 generations. In addition, the U-SIG field may also include one or more version-dependent field(s). Under the proposed scheme, the EHT-SIG field may have a variable length and it may be modulated and coded via various modulation coding schemes (MCS). Under the proposed scheme, the EHT-SIG field may be immediately after the U-SIG field.

Figure 3A:
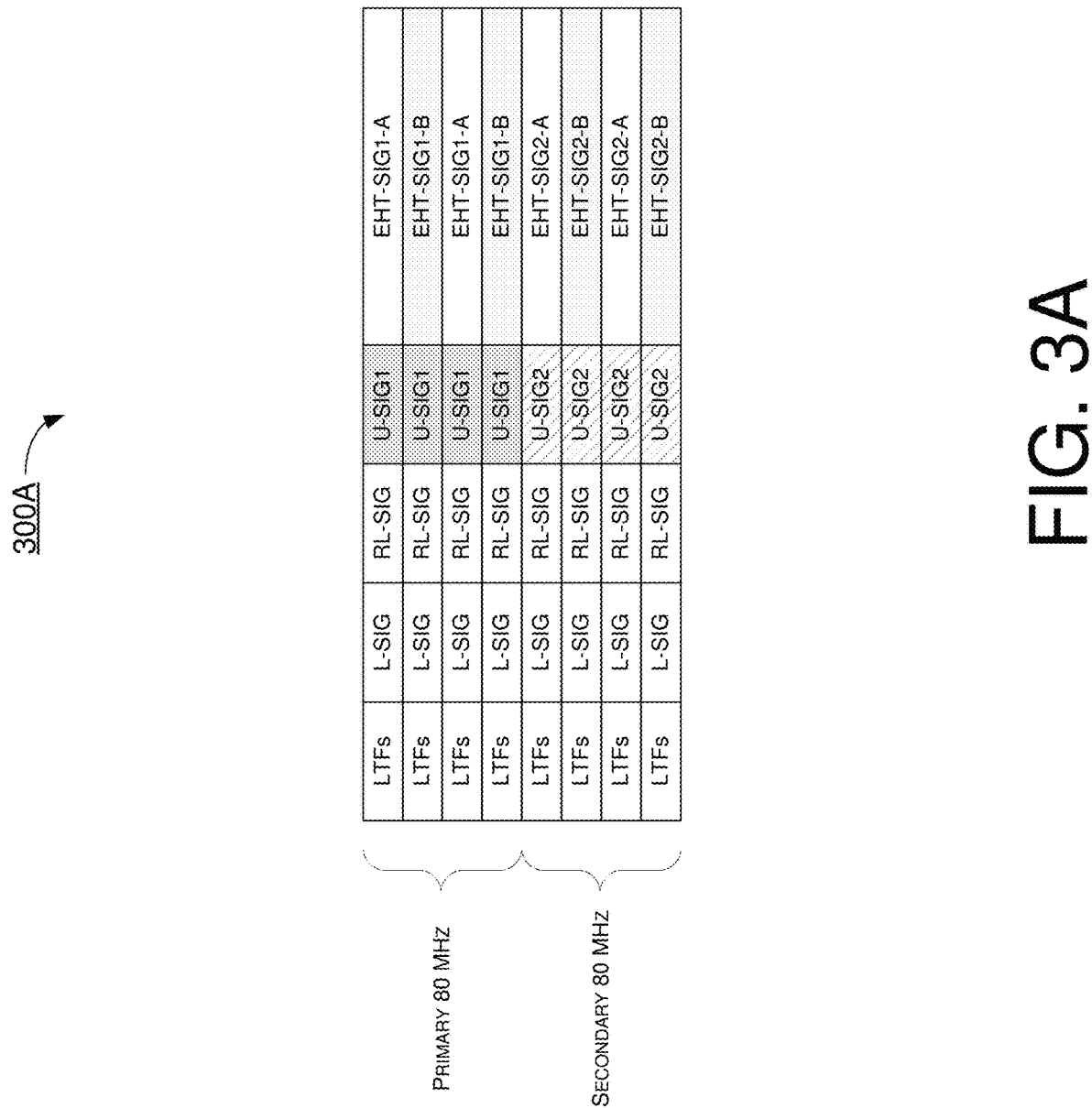
FIG. 3B is a diagram of an example scenario of per-80 MHz preamble signaling in accordance with an implementation of the present disclosure.
Figure 3B:
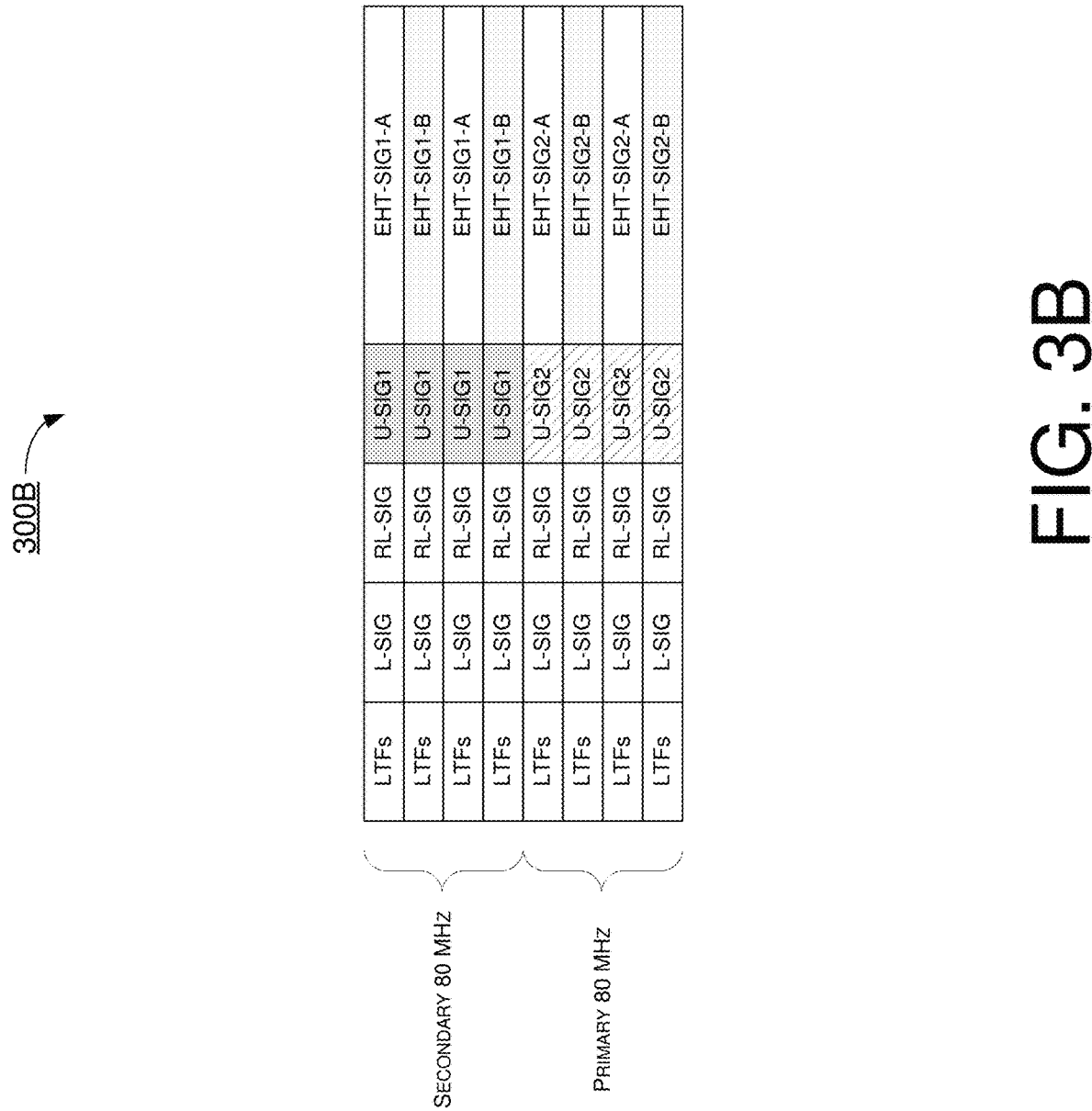

Each of FIG. 3A and FIG. 3B illustrates an example scenario 300A/300B of per-80 MHz preamble signaling in accordance with an implementation of the present disclosure. Under a proposed scheme in accordance with the present disclosure, per-80 MHz preamble signaling may be preferred in order to reduce the length of the EHT-SIG field. Under the proposed scheme, the U-SIG field may be duplicated within (but not outside) a given 80-MHz bandwidth. That is, the U-SIG field in each 80-MHz bandwidth may be the same, while the U-SIG field in one 80-MHz bandwidth may be different from the U-SIG field in another 80-MHz bandwidth. Moreover, the EHT-SIG field may correspond to two or four content channels. Furthermore, under the proposed scheme, the EHT-SIG field may carry different contents for a plurality of content channels in each of a plurality of 80-MHz bandwidths or in each of a plurality of 160-MHz bandwidths (e.g., for PPDU bandwidth larger than 80 MHz).

Furthermore, in scenario 300A and scenario 300B, each STA (e.g., STA 110, STA 120 and STA 130) may be aware of which specific 80-MHz bandwidth its content channel(s) is/are located in before receiving a given EHT PPDU. For instance, a subchannel selective transmission (SST) mechanism may be utilized by the STAs to obtain identifying information that identifies the specific 80-MHz bandwidth in which respective content channels are located. Accordingly, each STA may process or decode the preamble (including the SFTs and LTFs) of one specific 80-MHz bandwidth in which its content channel(s) is/are located, and there is no need for the STA to process/decode the preamble of any other 80-MHz bandwidth in which its content channel(s) is/are not located. Moreover, an HE STA that supports HE SST operation may set dot11HESubchannel-Selective-TransmissionImplemented to true and may set the HE SST Support field in the HE Capabilities element it transmits to 1. Furthermore, an HE STA that does not support HE SST operation may set the HE SST Support field in the HE Capabilities element it transmits to 0. Additionally, in some cases, the SST operation may be implemented using a target wake time (TWT). This feature is hence referred to as "per-80 MHz preamble signaling" herein and is implemented not only in scenarios 300A and 300B but also in scenarios 400A, 400B, 500A and 500B described below.

In scenario 300A, an aggregated PPDU in two 80-MHz bandwidths is shown, with the top one of the two 80-MHz bandwidths being a primary 80-MHz bandwidth and the bottom one of the two 80-MHz bandwidths being a secondary 80-MHz bandwidth. Under the proposed scheme, the U-SIG field is duplicated within each of the primary and secondary 80-MHz bandwidths. In scenario 300A, for the U-SIG field, U-SIG1 is duplicated in the primary 80-MHz bandwidth and U-SIG2 is duplicated in the secondary 80-MHz bandwidth. Moreover, in the primary 80-MHz bandwidth the EHT-SIG field corresponds to two content channels, namely EHT-SIG1-A for a first STA and EHT-SIG1-B for a second STA. Similarly, in the secondary 80-MHz bandwidth the EHT-SIG field corresponds to two content channels, namely EHT-SIG2-A for a third STA and EHT-SIG2-B for a fourth STA.

In scenario 300B, an aggregated PPDU in two 80-MHz bandwidths is shown, with the bottom one of the two 80-MHz bandwidths being a primary 80-MHz bandwidth and the top one of the two 80-MHz bandwidths being a secondary 80-MHz bandwidth. Under the proposed scheme, the U-SIG field is duplicated within each of the primary and secondary 80-MHz bandwidths. In scenario 300B, for the U-SIG field, U-SIG1 is duplicated in the secondary 80-MHz bandwidth and U-SIG2 is duplicated in the primary 80-MHz bandwidth. Moreover, in the primary 80-MHz bandwidth the EHT-SIG field corresponds to two content channels, namely EHT-SIG2-A for a first STA and EHT-SIG2-B for a second STA. Similarly, in the secondary 80-MHz bandwidth the EHT-SIG field corresponds to two content channels, namely EHT-SIG1-A for a third STA and EHT-SIG1-B for a fourth STA.

Figure 4A:
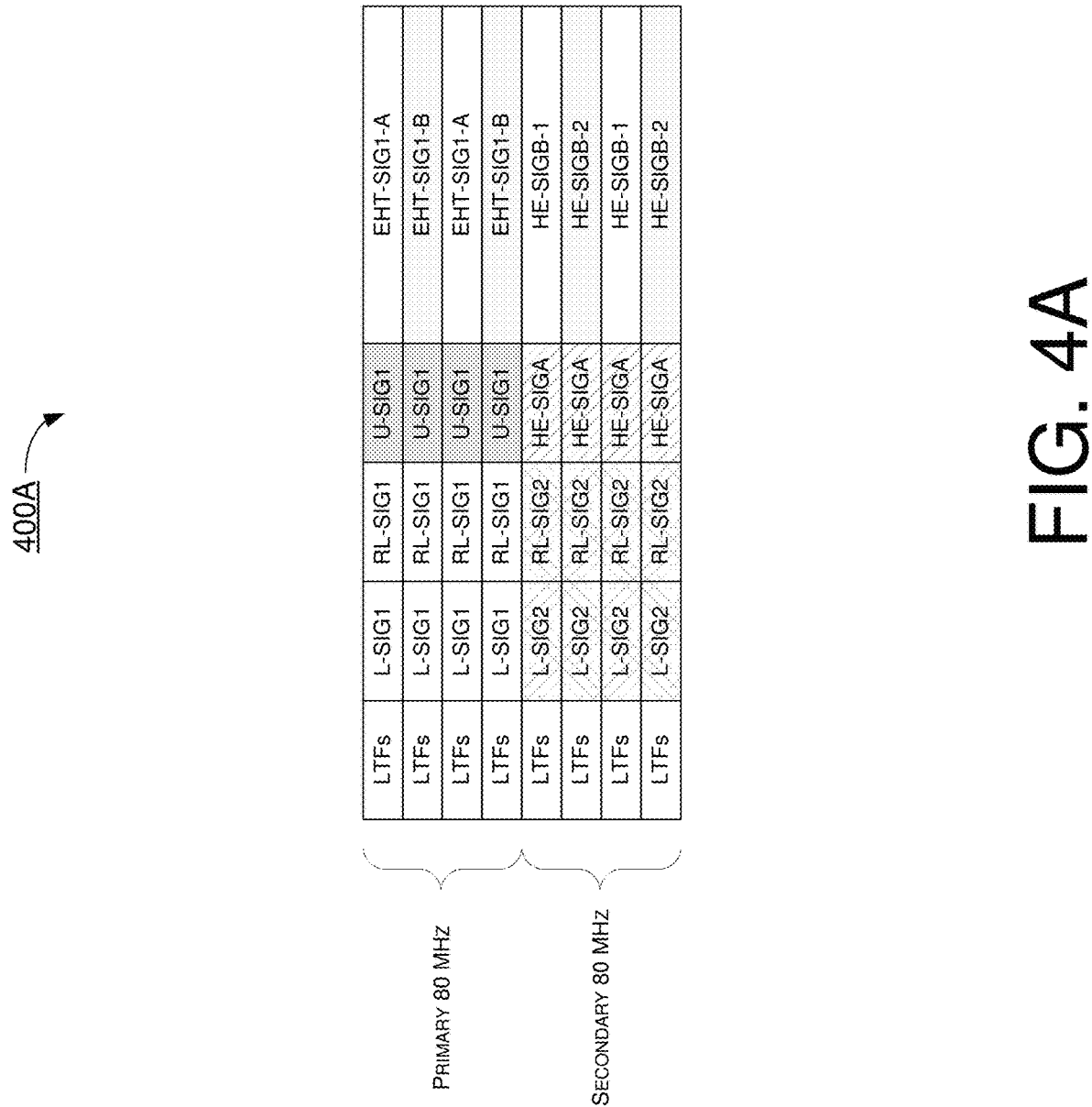
FIG. 4B is a diagram of an example scenario of simultaneous transmissions to mixed clients in accordance with an implementation of the present disclosure.
Figure 4B:
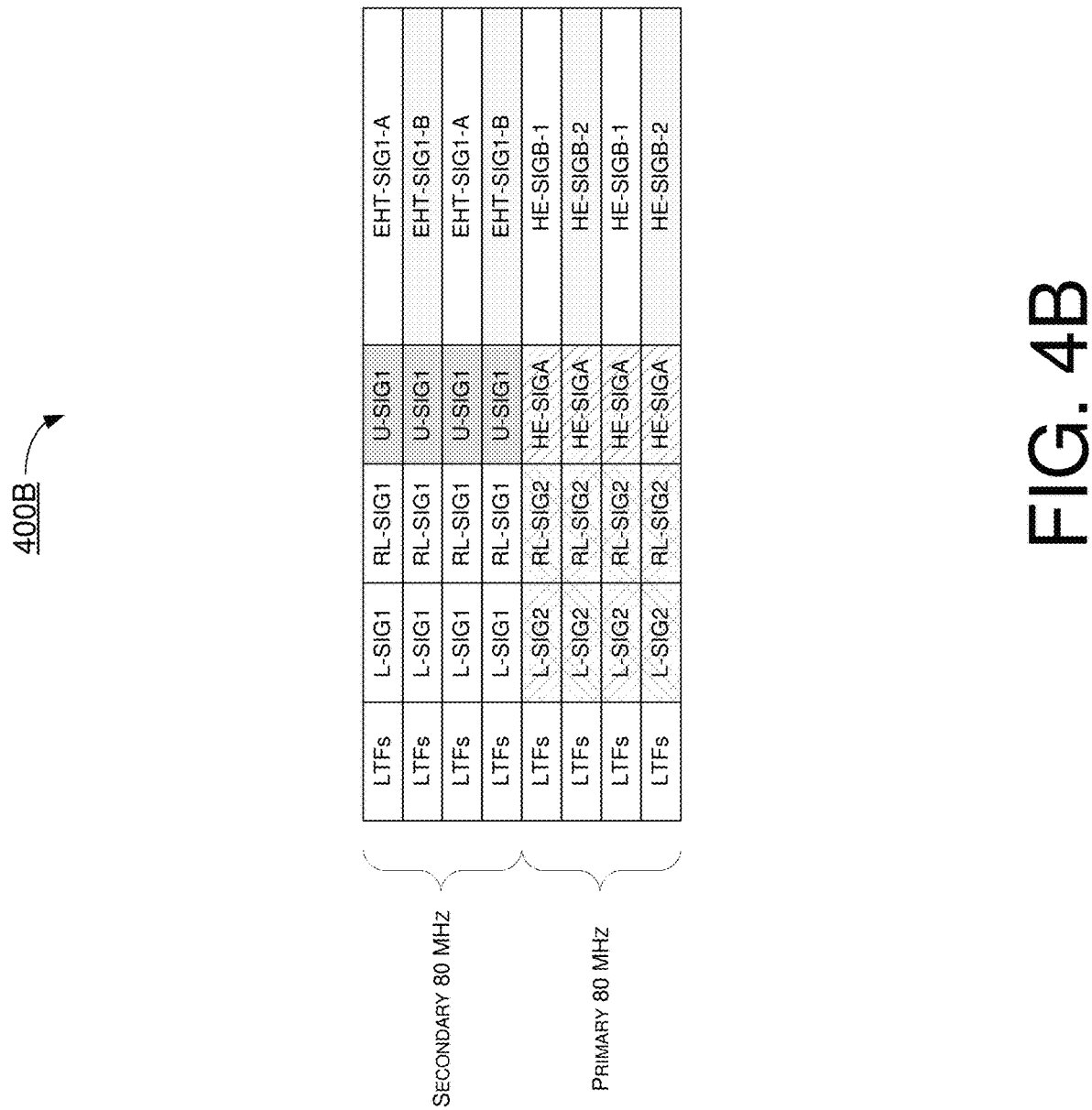

Each of FIG. 4A and FIG. 4B illustrates an example scenario 400A/400B of simultaneous transmissions to mixed clients in accordance with an implementation of the present disclosure. Under a proposed scheme in accordance with the present disclosure, the L-SIG and RL-SIG fields are different for each 80-MHz bandwidth or each 160-MHz bandwidth such that HE and EHT formats are transmitted within one EHT PPDU. For instance, in scenario 400A and scenario 400B, the LENGTH field in L-SIG1 and L-SIG2 is used to differentiate EHT or HE PPDU types. Under the proposed scheme, boundaries of OFDM symbols of the different fields and content channels in the multiple 80-MHz bandwidths need to be aligned in the time domain. Moreover, there is no maximal-ratio combining (MRC) issue crossing a given 80-MHz bandwidth in case each STA knows that its content-carrying bandwidth is 80 MHz and that "bandwidth+puncture" information is contained in the U-SIG field of each 80-MHz bandwidth. It is noteworthy that the two 80-MHz bandwidths in each of scenario 400A and scenario 400B may be regarded as two aggregated PPDUs in the frequency domain on a 80-MHz or 160-MHz basis.

Furthermore, in scenario 400A and scenario 400B, each STA (e.g., STA 110, STA 120 and STA 130) may be aware of which specific 80-MHz bandwidth its content channel(s) is/are located in before receiving a given EHT PPDU. For instance, an SST mechanism may be utilized by the STAs to obtain identifying information that identifies the specific 80-MHz bandwidth in which respective content channels are located. Accordingly, each STA may process or decode the preamble (including the SFTs and LTFs) of one specific 80-MHz bandwidth in which its content channel(s) is/are located, and there is no need for the STA to process/decode the preamble of any other 80-MHz bandwidth in which its content channel(s) is/are not located.

In scenario 400A, an aggregated PPDU (or two aggregated PPDUs) in two 80-MHz bandwidths is shown, with the top one of the two 80-MHz bandwidths being a primary 80-MHz bandwidth and the bottom one of the two 80-MHz bandwidths being a secondary 80-MHz bandwidth. Under the proposed scheme, the LENGTH field in each of the L-SIG and RL-SIG fields in the primary 80-MHz bandwidth is L-SIG1 and RL-SIG1, respectively, to indicate that the primary 80-MHz bandwidth is in the EHT format. Similarly, the LENGTH field in each of the L-SIG and RL-SIG fields in the secondary 80-MHz bandwidth is L-SIG2 and RL-SIG2, respectively, to indicate that the secondary 80-MHz bandwidth is in the HE format. In scenario 400A, for the U-SIG field, U-SIG1 is duplicated in the primary 80-MHz bandwidth and HE-SIGA is duplicated in the secondary 80-MHz bandwidth. Moreover, in the primary 80-MHz bandwidth the EHT-SIG field corresponds to two content channels, namely EHT-SIG1-A for a first STA and EHT-SIG1-B for a second STA. Similarly, in the secondary 80-MHz bandwidth the EHT-SIG field corresponds to two content channels, namely HE-SIGB-1 for a third STA and HE-SIGB-2 for a fourth STA.

In scenario 400B, an aggregated PPDU (or two aggregated PPDUs) in two 80-MHz bandwidths is shown, with the bottom one of the two 80-MHz bandwidths being a primary 80-MHz bandwidth and the top one of the two 80-MHz bandwidths being a secondary 80-MHz bandwidth. Under the proposed scheme, the LENGTH field in each of the L-SIG and RL-SIG fields in the primary 80-MHz bandwidth is L-SIG2 and RL-SIG2, respectively, to indicate that the primary 80-MHz bandwidth is in the HE format. Similarly, the LENGTH field in each of the L-SIG and RL-SIG fields in the secondary 80-MHz bandwidth is L-SIG1 and RL-SIG1, respectively, to indicate that the secondary 80-MHz bandwidth is in the EHT format. In scenario 400B, for the U-SIG field, HE-SIGA is duplicated in the primary 80-MHz bandwidth and U-SIG1 is duplicated in the secondary 80-MHz bandwidth. Moreover, in the primary 80-MHz bandwidth the EHT-SIG field corresponds to two content channels, namely HE-SIGB-1 for a first STA and HE-SIGB-2 for a second STA. Similarly, in the secondary 80-MHz bandwidth the EHT-SIG field corresponds to two content channels, namely EHT-SIG1-A for a third STA and EHT-SIG1-B for a fourth STA.

Figure 5A:
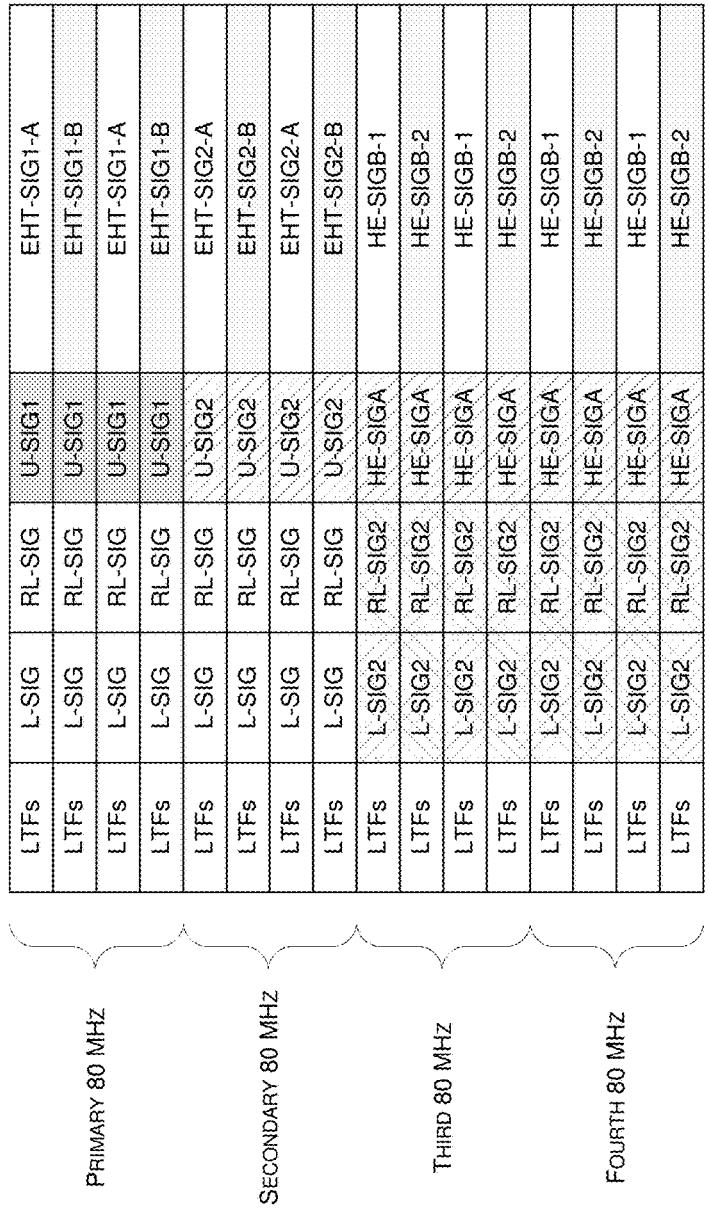
FIG. 5B is a diagram of an example scenario of simultaneous transmissions to mixed clients in accordance with an implementation of the present disclosure.
Figure 5B:
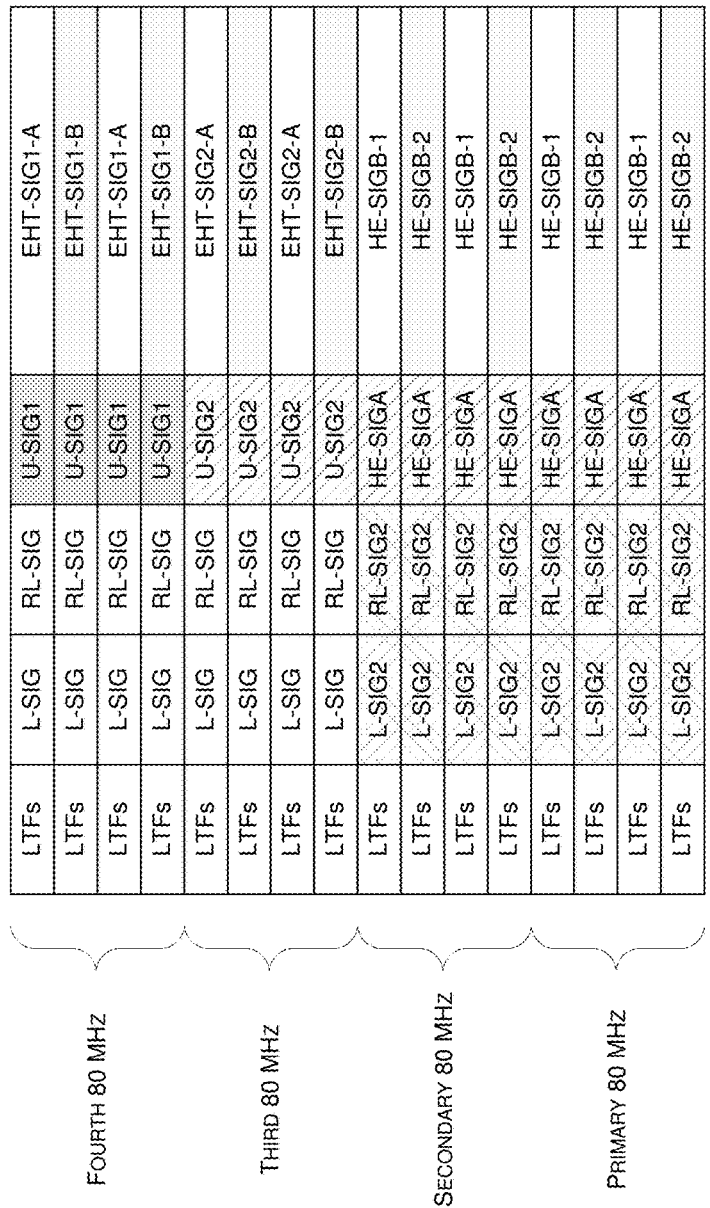

Each of FIG. 5A and FIG. 5B illustrates an example scenario 500A/500B of simultaneous transmissions to mixed clients in accordance with an implementation of the present disclosure. Under a proposed scheme in accordance with the present disclosure, the concept described above may be applied to a 320-MHz PPDU in order to avoid bandwidth or possible MRC issue. It is noteworthy that the fourth 80-MHz bandwidths in each of scenario 500A and scenario 500B may be regarded as one, two or four aggregated PPDUs in the frequency domain on a 80-MHz, 160-MHz or 320-MHz basis.

Furthermore, in scenario 500A and scenario 500B, each STA (e.g., STA 110, STA 120 and STA 130) may be aware of which specific 80-MHz bandwidth its content channel(s) is/are located in before receiving a given EHT PPDU. For instance, an SST mechanism may be utilized by the STAs to obtain identifying information that identifies the specific 80-MHz bandwidth in which respective content channels are located. Accordingly, each STA may process or decode the preamble (including the SFTs and LTFs) of one specific 80-MHz bandwidth in which its content channel(s) is/are located, and there is no need for the STA to process/decode the preamble of any other 80-MHz bandwidth in which its content channel(s) is/are not located.

In scenario 500A, an aggregated PPDU (or two or four aggregated PPDUs) in four 80-MHz bandwidths is shown, with the top one of the four 80-MHz bandwidths being a primary 80-MHz bandwidth, the second one from top of the four 80-MHz bandwidths being a secondary 80-MHz bandwidth, the third one from top of the four 80-MHz bandwidths being a third 80-MHz bandwidth, and the bottom one of the four 80-MHz bandwidths being a fourth 80-MHz bandwidth. Under the proposed scheme, the LENGTH field in each of the L-SIG and RL-SIG fields in the primary and secondary 80-MHz bandwidths is L-SIG and RL-SIG, respectively, to indicate that the primary and secondary 80-MHz bandwidths are in the EHT format. Similarly, the LENGTH field in each of the L-SIG and RL-SIG fields in the third and fourth 80-MHz bandwidths is L-SIG2 and RL-SIG2, respectively, to indicate that the third and fourth 80-MHz bandwidths are in the HE format. In scenario 500A, for the U-SIG field, U-SIG1 is duplicated in the primary 80-MHz bandwidth, U-SIG2 is duplicated in the secondary 80-MHz bandwidth, and HE-SIGA is duplicated in the third and fourth 80-MHz bandwidths. Moreover, in the primary 80-MHz bandwidth the EHT-SIG field corresponds to two content channels, namely EHT-SIG1-A for a first STA and EHT-SIG1-B for a second STA. Similarly, in the secondary 80-MHz bandwidth the EHT-SIG field corresponds to two content channels, namely EHT-SIG2-A for a third STA and EHT-SIG2-B for a fourth STA. Likewise, in the third and fourth 80-MHz bandwidths the EHT-SIG field corresponds to two content channels, namely HE-SIGB-1 for a fifth STA and HE-SIGB-2 for a sixth STA.

In scenario 500B, an aggregated PPDU (or two or four aggregated PPDUs) in four 80-MHz bandwidths is shown, with the bottom one of the four 80-MHz bandwidths being a primary 80-MHz bandwidth, the second one from bottom of the four 80-MHz bandwidths being a secondary 80-MHz bandwidth, the third one from bottom of the four 80-MHz bandwidths being a third 80-MHz bandwidth, and the top one of the four 80-MHz bandwidths being a fourth 80-MHz bandwidth. Under the proposed scheme, the LENGTH field in each of the L-SIG and RL-SIG fields in the primary and secondary 80-MHz bandwidths is L-SIG2 and RL-SIG2, respectively, to indicate that the primary and secondary 80-MHz bandwidths are in the HE format. Similarly, the LENGTH field in each of the L-SIG and RL-SIG fields in the third and fourth 80-MHz bandwidths is L-SIG and RL-SIG, respectively, to indicate that the third and fourth 80-MHz bandwidths are in the EHT format. In scenario 500B, for the U-SIG field, HE-SIGA is duplicated in the primary and secondary 80-MHz bandwidths, U-SIG2 is duplicated in the third 80-MHz bandwidth, and U-SIG1 is duplicated in the fourth 80-MHz bandwidth. Moreover, in the primary and secondary 80-MHz bandwidths the EHT-SIG field corresponds to two content channels, namely HE-SIGB-1 for a first STA and HE-SIGB-2 for a second STA. Similarly, in the third 80-MHz bandwidth the EHT-SIG field corresponds to two content channels, namely EHT-SIG2-A for a third STA and EHT-SIG2-B for a fourth STA. Likewise, in the fourth 80-MHz bandwidth the EHT-SIG field corresponds to two content channels, namely EHT-SIG1-A for a fifth STA and EHT-SIG1-B for a sixth STA. Under a proposed scheme in accordance with the present disclosure, the HE portion (including the primary and secondary 80-MHz bandwidths for a total of 160 MHz bandwidth) may carry the same content or information. Moreover, for the EHT portion (including the third and fourth 80-MHz bandwidths), each 80-MHz bandwidth may carry information/content different from that carried in the other 80-MHz bandwidth.

Under a proposed scheme in accordance with the present disclosure, an indication of bandwidth plus puncture may be within the U-SIG field and may be different for each 80-MHz bandwidth. For instance, for each 80-MHz bandwidth, there may be several (e.g., six) possible puncture modes and, thus, a four-bit bitmap may be used for puncture. In case that bandwidth and puncture patterns are combined, then six bits (e.g., for a six-bit bitmap) may be required in the U-SIG field.

Under a proposed scheme in accordance with the present disclosure, each STA (e.g., STA 110, STA 120 and STA 130) may be aware of the location (e.g., in the frequency domain) of its content channel(s) before reception of one or more PPDUs (e.g., in accordance with the IEEE 802.11 be standard). Under the proposed scheme, information such as RU allocation and modulation for each target (or recipient) STA may be carried in the EHT-SIG fields. Moreover, there may be various ways to design the content channels. In a first approach, similar to that defined in the IEEE 802.11 ax standard, two content channels may be independently encoded. In a second approach, four content channels may be independently encoded. In a third approach, four content channels, or one large bandwidth (e.g., 320-MHz bandwidth) content channel, may be jointly encoded.

Illustrative Implementations

FIG. 6 illustrates an example system 600 having at least an example apparatus 610 and an example apparatus 620 in accordance with an implementation of the present disclosure. Each of apparatus 610 and apparatus 620 may perform various functions to implement schemes, techniques, processes and methods described herein pertaining to EHT preamble designs for transmissions to mixed clients in wireless communications, including the various schemes described above with respect to various proposed designs, concepts, schemes, systems and methods described above as well as processes described below. For instance, apparatus 610 may be an example implementation of communication entity 110, and apparatus 620 may be an example implementation of communication entity 120 or communication entity 130.

Each of apparatus 610 and apparatus 620 may be a part of an electronic apparatus, which may be a non-AP STA or an AP STA, such as a portable or mobile apparatus, a wearable apparatus, a wireless communication apparatus or a computing apparatus. For instance, each of apparatus 610 and apparatus 620 may be implemented in a smartphone, a smart watch, a personal digital assistant, a digital camera, or a computing equipment such as a tablet computer, a laptop computer or a notebook computer. Each of apparatus 610 and apparatus 620 may also be a part of a machine type apparatus, which may be an IoT apparatus such as an immobile or a stationary apparatus, a home apparatus, a wire communication apparatus or a computing apparatus. For instance, each of apparatus 610 and apparatus 620 may be implemented in a smart thermostat, a smart fridge, a smart door lock, a wireless speaker or a home control center. When implemented in or as a network apparatus, apparatus 610 and/or apparatus 620 may be implemented in a network node, such as an AP in a WLAN.

In some implementations, each of apparatus 610 and apparatus 620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 610 and apparatus 620 may be implemented in or as a STA or an AP. Each of apparatus 610 and apparatus 620 may include at least some of those components shown in FIG. 6 such as a processor 612 and a processor 622, respectively, for example. Each of apparatus 610 and apparatus 620 may further include one or more other components not pertinent to the proposed scheme of the present disclosure (e.g., internal power supply, display device and/or user interface device), and, thus, such component(s) of apparatus 610 and apparatus 620 are neither shown in FIG. 6 nor described below in the interest of simplicity and brevity.

In one aspect, each of processor 612 and processor 622 may be implemented in the form of one or more single-core processors, one or more multi-core processors, one or more RISC processors or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including those pertaining to EHT preamble designs for transmissions to mixed clients in wireless communications in accordance with various implementations of the present disclosure. For instance, each of processor 612 and processor 622 may be configured with hardware components, or circuitry, implementing one, some or all of the proposed schemes, designs, concepts, examples and embodiments described herein.

In some implementations, apparatus 610 may also include a transceiver 616 coupled to processor 612. Transceiver 616 may be capable of wirelessly transmitting and receiving data. In some implementations, apparatus 620 may also include a transceiver 626 coupled to processor 622. Transceiver 626 may include a transceiver capable of wirelessly transmitting and receiving data.

In some implementations, apparatus 610 may further include a memory 614 coupled to processor 612 and capable of being accessed by processor 612 and storing data therein. In some implementations, apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable programmable ROM (EPROM) and/or electrically erasable programmable ROM (EEPROM). Alternatively, or additionally, each of memory 614 and memory 624 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 610 and apparatus 620 may be a communication entity capable of communicating with each other using various proposed schemes in accordance with the present disclosure. For illustrative purposes and without limitation, a description of capabilities of apparatus 610, as communication entity 110, and apparatus 620, as communication entity 120 or communication entity 130, is provided below. It is noteworthy that, although the example implementations described below are provided in the context of WLAN, the same may be implemented in other types of networks. Thus, although the following description of example implementations pertains to a scenario in which apparatus 610 functions as a transmitting device and apparatus 620 functions as a receiving device, the same is also applicable to another scenario in which apparatus 610 functions as a receiving device and apparatus 620 functions as a transmitting device.

In one aspect of EHT preamble designs for transmissions to mixed clients in wireless communications in accordance with the present disclosure, processor 612 of apparatus 610 (e.g., as STA 110 in network environment 100) may receive, via transceiver 616, an aggregated PPDU (e.g., from apparatus 620 as STA 120 or STA 130 in network environment 100) which is transmitted over a plurality of 80-MHz bandwidths with data for a plurality of STAs. Additionally, processor 612 may decode a preamble of a specific one of the plurality of 80-MHz bandwidths.

In some implementations, the aggregated PPDU may contain data for STAs of at least two different generations.

In some implementations, the aggregated PPDU may include an EHT PPDU and a HE PPDU. In such cases, the EHT PPDU may contain data for one or more EHT STAs, and the HE PPDU may contain data for one or more HE STAs.

In some implementations (e.g., as shown in FIG. 5B), the HE PPDU may include a primary 80-MHz bandwidth and a secondary 80-MHz bandwidth, thereby covering a 160-MHz bandwidth total in which same information is carried. Moreover, the EHT PPDU may include a third 80-MHz bandwidth and a fourth 80-MHz bandwidth each of which carrying respective information different from that carried in the other 80-MHz bandwidth of the EHT PPDU.

In some implementations, in each of the plurality of 80-MHz bandwidths, a LENGTH field in a legacy signal (L-SIG) field may be used to differentiate the EHT PPDU and the HE PPDU.

In some implementations, boundaries of OFDM symbols of a plurality of fields and a plurality of content channels in the plurality of 80-MHz bandwidths may be aligned in a time domain.

In some implementations, in each of the plurality of 80-MHz bandwidths, a universal signal (U-SIG) field may be the same for a plurality of content channels in the respective 80-MHz bandwidth.

In some implementations, a first U-SIG field in a first 80-MHz bandwidth of the plurality of 80-MHz bandwidths and a second U-SIG field in a second 80-MHz bandwidth of the plurality of 80-MHz bandwidths may be different.

In some implementations, information on bandwidth and puncture may be indicated in the U-SIG field. In some implementations, in an event that bandwidth and puncture patterns are combined, the U-SIG field may include six bits representing information on the bandwidth and puncture.

In some implementations, the U-SIG field may include a four-bit bitmap representing information on the puncture.

In some implementations, the aggregated PPDU may include a 160-MHz PPDU or a 320-MHz PPDU. In such cases, the aggregated PPDU may be transmitted over two or four 80-MHz bandwidths, respectively.

In some implementations, in each of the plurality of 80-MHz bandwidths, an EHT signal (EHT-SIG) field may contain information on RU allocation and modulation for one or more target STAs of the respective 80-MHz bandwidth.

In some implementations, the EHT-SIG field may carry different contents for a plurality of content channels in each of the plurality of 80-MHz bandwidths (or in each of a plurality of 160-MHz bandwidths).

In some implementations, a plurality of content channels in each of the plurality of 80-MHz bandwidths may be independently encoded. Alternatively, the plurality of content channels in each of the plurality of 80-MHz bandwidths may be jointly encoded.

In some implementations, processor 612 may also obtain, via an SST mechanism, information that identifies the specific one of the plurality of 80-MHz bandwidths before receiving the aggregated PPDU. In such cases, in decoding the preamble, processor 612 may decode the preamble of the specific one of the plurality of 80-MHz bandwidths based on the identifying information.

In another aspect of EHT preamble designs for transmissions to mixed clients in wireless communications in accordance with the present disclosure, processor 612 of apparatus 610 (e.g., as STA 110 in network environment 100) may generate an aggregated PPDU. Moreover, processor 612 may transmit, via transceiver 616, the aggregated PPDU (e.g., to apparatus 620 as STA 120 or STA 130 in network environment 100) over a plurality of 80-MHz bandwidths with data for a plurality of STAs.

In some implementations, the aggregated PPDU may contain data for STAs of at least two different generations.

In some implementations, the aggregated PPDU may include an EHT PPDU and a HE PPDU. In such cases, the EHT PPDU may contain data for one or more EHT STAs, and the HE PPDU may contain data for one or more HE STAs.

In some implementations, boundaries of OFDM symbols of a plurality of fields and a plurality of content channels in the plurality of 80-MHz bandwidths may be aligned in a time domain.

In some implementations, in each of the plurality of 80-MHz bandwidths, a LENGTH field in a legacy signal (L-SIG) field may be used to differentiate the EHT PPDU and the HE PPDU.

In some implementations, in each of the plurality of 80-MHz bandwidths, a universal signal (U-SIG) field may be the same for a plurality of content channels in the respective 80-MHz bandwidth. In some implementations, a first U-SIG field in a first 80-MHz bandwidth of the plurality of 80-MHz bandwidths and a second U-SIG field in a second 80-MHz bandwidth of the plurality of 80-MHz bandwidths may be different.

In some implementations, information on bandwidth and puncture may be indicated in the U-SIG field.

In some implementations, the U-SIG field may include a four-bit bitmap representing information on the puncture. In some implementations, in an event that bandwidth and puncture patterns are combined, the U-SIG field may include six bits representing information on the bandwidth and puncture.

In some implementations, in each of the plurality of 80-MHz bandwidths, an EHT signal (EHT-SIG) field may contain information on RU allocation and modulation for one or more target STAs of the respective 80-MHz bandwidth.

In some implementations, the EHT-SIG field may carry different contents for the plurality of content channels in each of the plurality of 80-MHz bandwidths (or in each of a plurality of 160-MHz bandwidths).

In some implementations, the aggregated PPDU may include a 160-MHz PPDU or a 320-MHz PPDU and is transmitted over two or four 80-MHz bandwidths, respectively.

In some implementations, a plurality of content channels in each of the plurality of 80-MHz bandwidths may be independently encoded or jointly encoded.

It is noteworthy that, although examples above with respect to different aspects of EHT preamble designs for transmissions to mixed clients in wireless communications are provided in the context of processor 612 of apparatus 610, the same may be applied to processor 622 of apparatus 620. That is, both processor 612 and processor 622 may be designed or otherwise configured to perform operations described above.

Illustrative Processes

Figure 7:
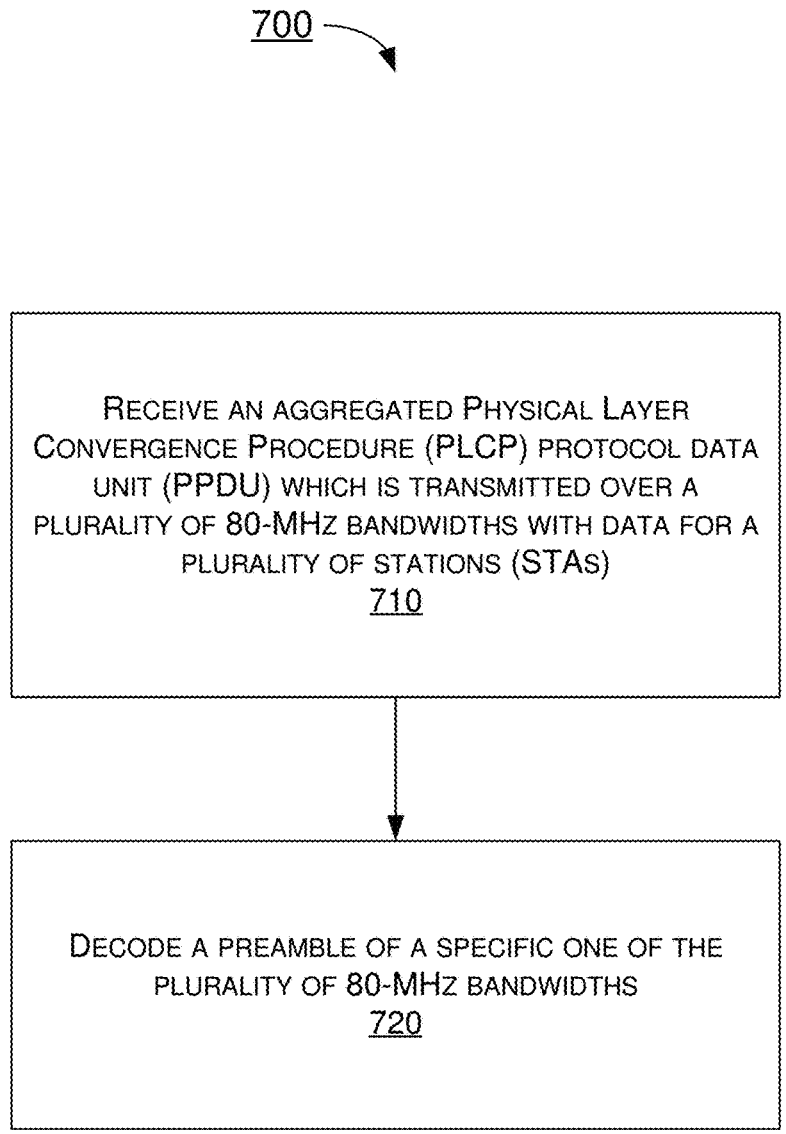
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to EHT preamble designs for transmissions to mixed clients in wireless communications in accordance with the present disclosure. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 610 and apparatus 620 as well as any variations thereof. Solely for illustrative purposes and without limiting the scope, process 700 is described below in the context of apparatus 610 as communication entity 110 (e.g., a transmitting device whether a non-AP STA or an AP STA) and apparatus 620 as communication entity 120 (e.g., a receiving device whether a non-AP STA or an AP STA) of a wireless network such as a WLAN in accordance with one or more of IEEE 802.11 standards. Process 700 may begin at block 710.

At 710, process 700 may involve processor 612 of apparatus 610 receiving, via transceiver 616, an aggregated PPDU which is transmitted over a plurality of 80-MHz bandwidths with data for a plurality of STAs. Process 700 may proceed from 710 to 720.

At 720, process 700 may involve processor 612 decoding a preamble of a specific one of the plurality of 80-MHz bandwidths.

In some implementations, the aggregated PPDU may contain data for STAs of at least two different generations.

In some implementations, the aggregated PPDU may include an EHT PPDU and a HE PPDU. In such cases, the EHT PPDU may contain data for one or more EHT STAs, and the HE PPDU may contain data for one or more HE STAs.

In some implementations (e.g., as shown in FIG. 5B), the HE PPDU may include a primary 80-MHz bandwidth and a secondary 80-MHz bandwidth, thereby covering a 160-MHz bandwidth total in which same information is carried. Moreover, the EHT PPDU may include a third 80-MHz bandwidth and a fourth 80-MHz bandwidth each of which carrying respective information different from that carried in the other 80-MHz bandwidth of the EHT PPDU.

In some implementations, in each of the plurality of 80-MHz bandwidths, a LENGTH field in a legacy signal (L-SIG) field may be used to differentiate the EHT PPDU and the HE PPDU.

In some implementations, boundaries of OFDM symbols of a plurality of fields and a plurality of content channels in the plurality of 80-MHz bandwidths may be aligned in a time domain.

In some implementations, in each of the plurality of 80-MHz bandwidths, a universal signal (U-SIG) field may be the same for a plurality of content channels in the respective 80-MHz bandwidth.

In some implementations, a first U-SIG field in a first 80-MHz bandwidth of the plurality of 80-MHz bandwidths and a second U-SIG field in a second 80-MHz bandwidth of the plurality of 80-MHz bandwidths may be different.

In some implementations, information on bandwidth and puncture may be indicated in the U-SIG field. In some implementations, in an event that bandwidth and puncture patterns are combined, the U-SIG field may include six bits representing information on the bandwidth and puncture.

In some implementations, the U-SIG field may include a four-bit bitmap representing information on the puncture.

In some implementations, the aggregated PPDU may include a 160-MHz PPDU or a 320-MHz PPDU. In such cases, the aggregated PPDU may be transmitted over two or four 80-MHz bandwidths, respectively.

In some implementations, in each of the plurality of 80-MHz bandwidths, an EHT signal (EHT-SIG) field may contain information on RU allocation and modulation for one or more target STAs of the respective 80-MHz bandwidth.

In some implementations, the EHT-SIG field may carry different contents for a plurality of content channels in each of the plurality of 80-MHz bandwidths (or in each of a plurality of 160-MHz bandwidths).

In some implementations, a plurality of content channels in each of the plurality of 80-MHz bandwidths may be independently encoded. Alternatively, the plurality of content channels in each of the plurality of 80-MHz bandwidths may be jointly encoded.

In some implementations, process 700 may further involve processor 612 obtaining, via an SST mechanism, information that identifies the specific one of the plurality of 80-MHz bandwidths before receiving the aggregated PPDU. In such cases, in decoding the preamble, process 700 may involve processor 612 decoding the preamble of the specific one of the plurality of 80-MHz bandwidths based on the identifying information.

Figure 8:
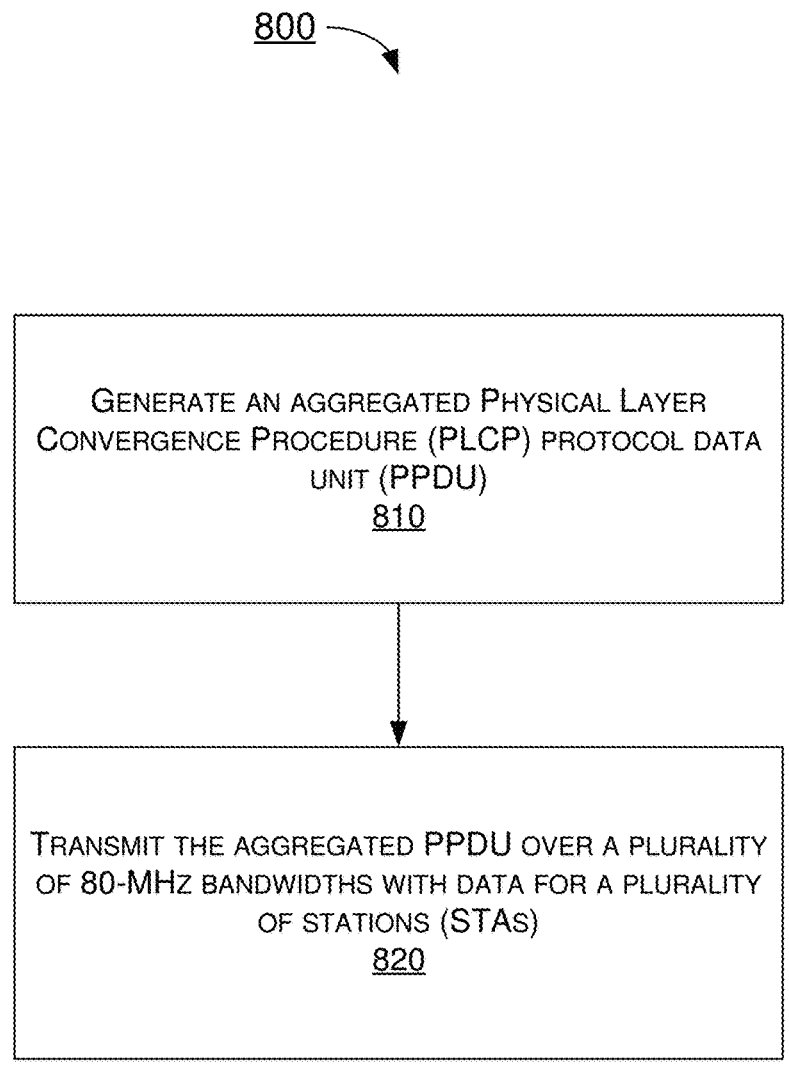
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining EHT preamble designs for transmissions to mixed clients in wireless communications in accordance with the present disclosure. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 610 and apparatus 620 as well as any variations thereof. Solely for illustrative purposes and without limiting the scope, process 800 is described below in the context of apparatus 610 as communication entity 80 (e.g., a transmitting device whether a non-AP STA or an AP STA) and apparatus 620 as communication entity 120 (e.g., a receiving device whether a non-AP STA or an AP STA) of a wireless network such as a WLAN in accordance with one or more of IEEE 802.11 standards. Process 800 may begin at block 810.

At 810, process 800 may involve processor 612 of apparatus 610 generating an aggregated PPDU. Process 800 may proceed from 810 to 820.

At 820, process 800 may involve processor 612 transmitting, via transceiver 616, the aggregated PPDU over a plurality of 80-MHz bandwidths with data for a plurality of STAs.

In some implementations, the aggregated PPDU may contain data for STAs of at least two different generations.

In some implementations, the aggregated PPDU may include an EHT PPDU and a HE PPDU. In such cases, the EHT PPDU may contain data for one or more EHT STAs, and the HE PPDU may contain data for one or more HE STAs.

In some implementations, boundaries of OFDM symbols of a plurality of fields and a plurality of content channels in the plurality of 80-MHz bandwidths may be aligned in a time domain.

In some implementations, in each of the plurality of 80-MHz bandwidths, a LENGTH field in a legacy signal (L-SIG) field may be used to differentiate the EHT PPDU and the HE PPDU.

In some implementations, in each of the plurality of 80-MHz bandwidths, a universal signal (U-SIG) field may be the same for a plurality of content channels in the respective 80-MHz bandwidth. In some implementations, a first U-SIG field in a first 80-MHz bandwidth of the plurality of 80-MHz bandwidths and a second U-SIG field in a second 80-MHz bandwidth of the plurality of 80-MHz bandwidths may be different.

In some implementations, information on bandwidth and puncture may be indicated in the U-SIG field.

In some implementations, the U-SIG field may include a four-bit bitmap representing information on the puncture. In some implementations, in an event that bandwidth and puncture patterns are combined, the U-SIG field may include six bits representing information on the bandwidth and puncture.

In some implementations, in each of the plurality of 80-MHz bandwidths, an EHT signal (EHT-SIG) field may contain information on RU allocation and modulation for one or more target STAs of the respective 80-MHz bandwidth.

In some implementations, the EHT-SIG field may carry different contents for the plurality of content channels in each of the plurality of 80-MHz bandwidths (each of a plurality of 160-MHz bandwidths).

In some implementations, the aggregated PPDU may include a 160-MHz PPDU or a 320-MHz PPDU and is transmitted over two or four 80-MHz bandwidths, respectively.

In some implementations, a plurality of content channels in each of the plurality of 80-MHz bandwidths may be independently encoded or jointly encoded.

Additional Notes

The herein-described subject matter sometimes illustrates different components contained within, or connected with, different other components. It is to be understood that such depicted architectures are merely examples, and that in fact many other architectures can be implemented which achieve the same functionality.

In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving an aggregated Physical Layer Convergence Procedure (PLCP) protocol data unit (PPDU) which is transmitted over a plurality of 80-MHz bandwidths with data for a plurality of stations (STAs); and
decoding a preamble of a specific one of the plurality of 80-MHz bandwidths,
wherein, in each of the plurality of 80-MHz bandwidths, a universal signal (U-SIG) field is same for a plurality of content channels in the respective 80-MHz bandwidth,
wherein an extreme hiqh-throuqhput (EHT) signal (EHT-SIG) field in a first 80-MHz bandwidth of the plurality of 80-MHz bandwidths corresponds to two channel contents associated with the STAs, and
wherein the EHT-SIG field in a second 80-MHz bandwidth of the plurality of 80-MHz bandwidths corresponds to two channel contents associated with the STAs.

2. The method of claim 1, wherein the aggregated PPDU contains data for STAs of at least two different generations.

3. The method of claim 2, wherein the aggregated PPDU comprises an extreme high-throughput (EHT) PPDU and a high-efficiency (HE) PPDU, wherein the EHT PPDU contains data for one or more EHT STAs, and wherein the HE PPDU contains data for one or more HE STAs.

4. The method of claim 3, wherein the HE PPDU comprises a primary 80-MHz bandwidth and a secondary 80-MHz bandwidth covering a 160-MHz bandwidth total in which same information is carried, and wherein the EHT PPDU comprises a third 80-MHz bandwidth and a fourth 80-MHz bandwidth each of which carrying respective information different from that carried in the other 80-MHz bandwidth of the EHT PPDU.

5. The method of claim 3, wherein, in each of the plurality of 80-MHz bandwidths, a LENGTH field in a legacy signal (L-SIG) field is used to differentiate the EHT PPDU and the HE PPDU.

6. The method of claim 2, wherein boundaries of orthogonal frequency-division multiplexing (OFDM) symbols of a plurality of fields and a plurality of content channels in the plurality of 80-MHz bandwidths are aligned in a time domain.

7. The method of claim 1, wherein a first U-SIG field in a first 80-MHz bandwidth of the plurality of 80-MHz bandwidths and a second U-SIG field in a second 80-MHz bandwidth of the plurality of 80-MHz bandwidths are different.

8. The method of claim 1, wherein information on bandwidth and puncture is indicated in the U-SIG field, and wherein, in an event that bandwidth and puncture patterns are combined, the U-SIG field comprises six bits representing information on the bandwidth and puncture.

9. The method of claim 1, wherein the U-SIG field comprises a four-bit bitmap representing information on the puncture.

10. The method of claim 1, wherein the aggregated PPDU comprises a 160-MHz PPDU or a 320-MHz PPDU and is transmitted over two or four 80-MHz bandwidths, respectively.

11. The method of claim 1, wherein, in each of the plurality of 80-MHz bandwidths, a respective EHT-SIG field contains information on resource unit (RU) allocation and modulation for one or more target STAs of the respective 80-MHz bandwidth.

12. The method of claim 1, wherein an extreme high-throughput (EHT) signal (EHT-SIG) field carries different contents for a plurality of content channels in each of the plurality of 80-MHz bandwidths or in each of a plurality of 160-MHz bandwidths.

13. The method of claim 1, wherein a plurality of content channels in each of the plurality of 80-MHz bandwidths are independently encoded or jointly encoded.

14. The method of claim 1, further comprising:
obtaining, via an SST mechanism, information that identifies the specific one of the plurality of 80-MHz bandwidths before receiving the aggregated PPDU,
wherein the decoding of the preamble comprises decoding the preamble of the specific one of the plurality of 80-MHz bandwidths based on the identifying information.

15. A method, comprising:
generating an aggregated Physical Layer Convergence Procedure (PLCP) protocol data unit (PPDU); and
transmitting the aggregated PPDU over a plurality of 80-MHz bandwidths with data for a plurality of stations (STAs),
wherein the aggregated PPDU contains data for STAs of at least two different generations,
wherein, in each of the plurality of 80-MHz bandwidths, a universal signal (U-SIG) field is same for a plurality of content channels in the respective 80-MHz bandwidth,
wherein a first U-SIG field in a first 80-MHz bandwidth of the plurality of 80-MHz bandwidths and a second U-SIG field in a second 80-MHz bandwidth of the plurality of 80-MHz bandwidths are different, and
wherein an extreme high-throughput (EHT) signal (EHT-SIG) field in the first 80-MHz bandwidth corresponds to two channel contents associated with the STAs, and
wherein the EHT-SIG field in the second 80-MHz bandwidth corresponds to two channel contents associated with the STAs.

16. The method of claim 15, wherein the aggregated PPDU comprises an extreme high-throughput (EHT) PPDU and a high-efficiency (HE) PPDU, wherein the EHT PPDU contains data for one or more EHT STAs, wherein the HE PPDU contains data for one or more HE STAs, wherein boundaries of orthogonal frequency-division multiplexing (OFDM) symbols of a plurality of fields and a plurality of content channels in the plurality of 80-MHz bandwidths are aligned in a time domain, and wherein, in each of the plurality of 80-MHz bandwidths, a LENGTH field in a legacy signal (L-SIG) field is used to differentiate the EHT PPDU and the HE PPDU.

17. The method of claim 15, wherein information on bandwidth and puncture is indicated in the U-SIG field, wherein the U-SIG field comprises a four-bit bitmap representing information on the puncture, wherein, in an event that bandwidth and puncture patterns are combined, the U-SIG field comprises six bits representing information on the bandwidth and puncture, wherein, in each of the plurality of 80-MHz bandwidths, an extreme high-throughput (EHT) signal (EHT-SIG) field contains information on resource unit (RU) allocation and modulation for one or more target STAs of the respective 80-MHz bandwidth, and wherein the EHT-SIG field carries different contents for the plurality of content channels in each of the plurality of 80-MHz bandwidths or in each of a plurality of 160-MHz bandwidths.

18. The method of claim 15, wherein the aggregated PPDU comprises a 160-MHz PPDU or a 320-MHz PPDU and is transmitted over two or four 80-MHz bandwidths, respectively, and wherein a plurality of content channels in each of the plurality of 80-MHz bandwidths are independently encoded or jointly encoded.

19. An apparatus, comprising:
a transceiver configured to communicate wirelessly; and
a processor coupled to the transceiver and configured to perform operations comprising:
receiving, via the transceiver, an aggregated Physical Layer Convergence Procedure (PLCP) protocol data unit (PPDU) which is transmitted over a plurality of 80-MHz bandwidths with data for a plurality of stations (STAs); and
decoding a preamble of a specific one of the plurality of 80-MHz bandwidths,
wherein, in each of the plurality of 80-MHz bandwidths, a universal signal (U-SIG) field is same for a plurality of content channels in the respective 80-MHz bandwidth, and
wherein an extreme high-throughput (EHT) signal (EHT-SIG) field in a first 80-MHz bandwidth of the plurality of 80-MHz bandwidths corresponds to two channel contents associated with the STAs, and
wherein the EHT-SIG field in a second 80-MHz bandwidth of the plurality of 80-MHz bandwidths corresponds to two channel contents associated with the STAs.

20. The apparatus of claim 19, wherein information on bandwidth and puncture is indicated in the U-SIG field, and wherein, in an event that bandwidth and puncture patterns are combined, the U-SIG field comprises six bits representing information on the bandwidth and puncture.

* * * * *